United States Patent
Menon et al.

(10) Patent No.: US 12,258,987 B2
(45) Date of Patent: Mar. 25, 2025

(54) SERVICEABLE FASTENER WITH A REMOVABLE HEAD

(71) Applicants: Pooja Narayan Menon, Bloomfield Hills, MI (US); Poorni Menon Walworth, Lake Orion, MI (US)

(72) Inventors: Pooja Narayan Menon, Bloomfield Hills, MI (US); Poorni Menon Walworth, Lake Orion, MI (US)

( * ) Notice: Subject to any disclaimer, the term of this patent is extended or adjusted under 35 U.S.C. 154(b) by 0 days.

(21) Appl. No.: 18/341,396

(22) Filed: Jun. 26, 2023

(65) Prior Publication Data

US 2023/0417267 A1    Dec. 28, 2023

Related U.S. Application Data

(60) Provisional application No. 63/473,743, filed on Jun. 24, 2022.

(51) Int. Cl.
*F16B 19/10* (2006.01)
*F16B 5/04* (2006.01)

(52) U.S. Cl.
CPC ............. *F16B 19/109* (2013.01); *F16B 5/04* (2013.01); *F16B 19/1045* (2013.01)

(58) Field of Classification Search
CPC . F16B 19/1054; F16B 19/1063; F16B 37/065
USPC ................ 411/34, 41, 43, 107, 183
See application file for complete search history.

(56) References Cited

U.S. PATENT DOCUMENTS

| | | | | |
|---|---|---|---|---|
| 3,451,303 A | * | 6/1969 | Biermann | F16B 37/065 411/107 |
| 4,436,467 A | * | 3/1984 | Larsson | F16B 19/125 411/107 |
| 5,915,901 A | * | 6/1999 | Aasgaard | B29C 66/43 411/29 |
| 7,156,596 B2 | | 1/2007 | Makino | |
| 7,384,226 B2 | * | 6/2008 | Jones | F16B 19/1054 411/509 |
| 8,444,354 B2 | * | 5/2013 | Nielsen | F16B 19/1054 411/501 |
| 10,578,143 B2 | * | 3/2020 | Schmidt | F16B 19/1072 |

\* cited by examiner

*Primary Examiner* — Flemming Saether
(74) *Attorney, Agent, or Firm* — The Dobrusin Law Firm, P.C.; Daniela M. Thompson-Walters (57) ABSTRACT

A fastener comprising: a) a body having: i) a first cylindrical portion with a first diameter, ii) a second cylindrical portion with a second diameter, iii) a shoulder part of the first cylindrical portion, iv) an exterior threaded portion, and v) a cylindrical hole extending along an axis of the body; b) a mandrel having: i) a shank, and ii) a mandrel head at an end of the shank; and c) a head having an opening defined by an interior threaded portion; wherein the mandrel shank at least partially occupies the cylindrical hole of the body; wherein the mandrel head is located outside of the body and opposite of the exterior threaded portion of the body; and wherein the exterior threaded portion of the body and the interior threaded portion of the head are engaged to removably secure the body to the head.

20 Claims, 7 Drawing Sheets

SERVICEABLE FASTENER WITH A REMOVABLE HEAD

CROSS REFERENCE TO RELATED APPLICATIONS

This application claims priority to U.S. Provisional Patent Application No. 63/473,743 filed on Jun. 24, 2022, and entitled Serviceable fastener with a removable head, which is hereby incorporated by reference in its entirety.

FIELD

The present teachings relate to a fastener. The fastener may find use as a blind rivet with a removable head.

BACKGROUND

Traditional blind rivets are useful for permanently fastening two sheets of material together. The blind rivet achieves this permanent fastening by plastic deformation of one end of the rivet. Once plastic deformation of the rivet occurs, the only way to remove the fastener is by a destructive removal method. A common destructive removal method is drilling out the body of the fastened rivet. Thus, traditional blind rivets are not optimized for use where it is known that the fastener might need to be removed in the future.

Removal of a traditional blind rivet presents multiple problems. First, the drilling of the rivet will generate chips. These chips may be of relatively small size and contaminate the work zone. This is of particular concern if electrical components are in the vicinity which may be shorted by the chips or the work area is otherwise sensitive to debris. Second, the drilling of traditional rivets is an imprecise operation which may result in damage to the panels which the rivet fastens. Often times, a drill which is too small is initially used and this results in failure to remove the rivet. Additionally, a rivet drilled with an undersized bit may begin to rotate freely which makes any subsequent drilling operation particularly challenging because the rivet will rotate with the drill bit. Alternatively, the rivet may be drilled with a bit that is too large which results in permanent damage to the panels being fastened.

A specialized blind rivet is described in U.S. Pat. No. 7,156,596 B2 which allows for non-destructive detachment but requires heavy deformation of a member in the installation process. This installation process calls for high forces and limits the application to thicker panels and requires the use of a heavy installation tool.

Therefore, the objective of the present disclosure is to provide a blind rivet that combines a rivet body with a detachable head. This blind rivet maintains a fastened state between a second panel and itself while allowing a first panel to be detached from the second panel from a single side. Stated otherwise, the present disclosure relates to a fastener which attaches a first panel to a second panel where the fastener body remains attached to the second panel when the first panel is removed.

What is needed is a blind rivet style fastener which allows for temporary unfastening. What is needed is a fastener which is capable of removably fastening two panels while only having access to one side of the panels. What is needed is a fastener with a separate body and head which can be attached to fasten panels and removed to allow disassembly of panels.

SUMMARY

The present teachings relate to a fastener comprising: a) a body having: i) a first cylindrical portion with a first diameter, ii) a second cylindrical portion with a second diameter, iii) a shoulder part of the first cylindrical portion, iv) an exterior threaded portion, and v) a cylindrical hole extending along an axis of the body; b) a mandrel having: i) a shank, and ii) a mandrel head at an end of the shank; and c) a head having an opening defined by an interior threaded portion; wherein the mandrel shank at least partially occupies the cylindrical hole of the body; wherein the mandrel head is located outside of the body and opposite of the exterior threaded portion of the body; and wherein the exterior threaded portion of the body and the interior threaded portion of the head are engaged to removably secure the body to the head.

The present teachings relate to a panel assembly comprising: a) a first panel; b) a second panel; and c) a fastener comprising: i) a body having: A) a first cylindrical portion with a first diameter, B) a second cylindrical portion with a second diameter, C) a shoulder part of the first cylindrical portion, D) an exterior threaded portion, and E) a cylindrical hole extending along an axis of the body; ii) a mandrel having: A) a shank, and B) a mandrel head at an end of the shank; and iii) a head having an opening defined by an interior threaded portion; wherein the mandrel shank at least partially occupies the cylindrical hole of the body; wherein the mandrel head is located outside of the body and opposite of the exterior threaded portion of the body; wherein the exterior threaded portion of the body and the interior threaded portion of the head are engaged to removably secure the body to the head; wherein a deformed area results on the body when the shank of the mandrel opposite of the mandrel head is pulled axially such that the mandrel head is pulled toward the head; wherein the first cylindrical portion of the body occupies a first hole in a first panel and the second cylindrical portion of the body occupies a second hole in a second panel; wherein the second hole in the second panel is smaller in diameter than the first diameter of the first cylindrical portion of the body; wherein the second panel is permanently mechanically constrained between the shoulder of the body and the deformed area of the body; and wherein the first panel is removably constrained between the head of the fastener and the second panel.

The present teachings provide for a fastener which may be used as a blind rivet style fastener while allowing for unfastening. The unfastening may be temporary. The present teachings may provide for a fastener with a separate body and head which can be attached to fasten panels and removed to allow disassembly of panels. The unfastening may be simply achieved by removing a threaded head even after the fastener is in a deformed state.

DETAILED DESCRIPTION

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a fastener. The fastener may removably constrain a first panel to a second panel. The fastener may be permanently affixed to the second panel. The fastener may allow for removal of the second panel from the first panel. The fastener may allow for re-constraint of the first panel to the second panel. The fastener may include a body, mandrel, head, or a combination thereof. The fastener may have a deformed state, an undeformed state, or both.

The fastener may include a body. The body may be deformed to permanently attach the body to a second panel. The body may occupy a first panel hole in a first panel. The body may occupy a second panel hole in a second panel. The body may removably affix the first panel to the second panel. The body may constrain the first panel between the second panel and a head. The body may allow for the first panel to be removed from the second panel non-destructively. The first panel may be removed from the second panel by removing the head from the body. The body may be a hollow tubular structure. The body may have a rounded or prismatic external shape. The external shape may refer to the periphery or cross-section (e.g., taken across the longitudinal axis). The body may have an outer perimeter which is circular, polygonal, or any other shape. The body may have one or more radial slots or holes along any portion of the body which are one or more body openings. The body may have a hole through its axis which is a body hole. The body may have two or more external diameters and cylindrical portions. The body may have a first diameter and a second diameter. The body may have a first cylindrical portion and a second cylindrical portion. The body may have a shoulder between the first cylindrical portion and the second cylindrical portion. The body may have an exterior threaded portion. The exterior threaded portion of the body may be at an end of the body opposite the second cylindrical portion. The external threaded portion of the body may interact with an internal threaded portion of the head to allow the head to be removably affixed to the body. The body may be affixed to the head via a snap-in feature, a spring feature, or a press fit connection. The body may contain a mandrel within the body hole. The may be deformed by the mandrel. The body may be installed without a mandrel by a clinching, welding, stacking or other process.

The body may include a first cylindrical portion. The first cylindrical portion may occupy a first panel hole in a first panel when the fastener is fastening a first panel to a second panel. The first cylindrical portion may have a first diameter. The first cylindrical portion may have a first diameter which is larger than the diameter of a second panel hole. The larger diameter of the first cylindrical portion may prevent the first cylindrical portion from occupying the second panel hole. The first diameter of the first cylindrical portion may be larger than the second diameter of the second cylindrical portion. The first cylindrical portion of the body may reside between the second cylindrical portion of the body and the exterior threaded portion of the body. The first diameter may have a length less than or equal to the thickness of the first panel. The first cylindrical portion may include surface textures or surface features. The first cylindrical portion may have knurling, ribbing, or other surface features. The first cylindrical portion may be formed by the same deformation process used to create the deformed zone. The first cylindrical portion may not occupy the entirety of the first panel hole. The first cylindrical portion may have any shape suitable for the body.

The first cylindrical portion may have a first diameter. The first diameter may be the outermost diameter of the first cylindrical portion. The first diameter may be larger than the second diameter. The first diameter may be larger than the diameter of the second panel hole. The first diameter may be smaller than the diameter of a first panel hole.

The body may include a second cylindrical portion. The second cylindrical portion may occupy a second panel hole in a second panel. A portion of the second cylindrical portion opposite the first cylindrical portion may be deformed to create a deformed area where the diameter of the deformed area is larger than the second diameter and the diameter of the second panel hole. The second cylindrical portion of the body may be inserted into the second panel hole until a shoulder of the body abuts the second panel prior to creation of the deformed area such that when the deformed area is created, the deformed area permanently constrains the second panel on the second cylindrical portion between the shoulder and the deformed area. The second diameter of the second cylindrical portion may be smaller than the first diameter of the first cylindrical portion. The second diameter may be larger than the diameter of the second panel hole. The second cylindrical portion may have a length which is greater than the thickness of the second panel. The second diameter may be the portion of the body opposite a threaded portion. The second cylindrical portion may have knurling, ribbing, or other surface features. The second cylindrical portion may have any shape suitable for the body. The second cylindrical portion may have a shape similar or dissimilar to that of the first cylindrical portion.

The second cylindrical portion may have a second diameter. The second diameter may be the outermost diameter of the second cylindrical portion. The second diameter may be smaller than the first diameter. The second diameter may be smaller than the diameter of the second panel hole. The second diameter may be smaller than the diameter of a first panel hole.

The body may include a shoulder. The shoulder may prevent the first cylindrical portion from occupying the second panel hole. The shoulder may allow for the body to be permanently affixed to the second panel by abutting the second panel and constraining the second panel between the shoulder and the deformed area. The shoulder may be a radial plane between the first diameter and the second diameter.

The body may include a deformed area. The deformed area may not exist prior to installation of the fastener. The deformed area may not exist prior to deformation of the fastener. The deformed area may permanently affix the body of the fastener to the second panel. The second panel may be positioned to abut the shoulder prior to creation of the deformed area. Creation of the deformed zone while second panel abuts the shoulder may permanently bind the second panel to the body. The deformed area may prevent removal of the second panel by having a diameter larger than the diameter of the second panel hole. The deformed area may be created by applying force to a mandrel which transfers that force through a mandrel head into the body. The force on the mandrel head may transfer to a portion of the second cylindrical portion of the body until plastic deformation of the body is achieved. The deformed area may be created by axial compression of the second cylindrical portion sufficient to achieve plastic deformation of the second diameter.

The body may include an exterior threaded portion. The exterior threaded portion of the body may allow for the body to be removably affixed to a head. The exterior threaded portion of the body may interact with an interior threaded portion of the head. The exterior threaded portion of the body may allow for the head to be removed from the body when the head is rotated in one direction relative to the body. The exterior threaded portion of the body may allow for the head to be affixed to the body when the head is rotated in an opposite direction relative to the body. The exterior threaded portion may be formed of left hand threads or right hand threads. The exterior threaded portion may be a standard (inch), metric, or other thread. The exterior threaded portion of the body may be an external thread while the interior threaded portion of the head may be a complementary internal thread. The exterior threaded portion of the body may be opposite the second diameter of the body.

The body may include a body hole. The body hole may contain a shank of a mandrel. The body hole may allow for the mandrel to transfer axial force through the body. The body hole may be a cylindrical hole which extends axially through the entire body. The body hole may have a diameter which is equal to or greater than the diameter of the shank of the mandrel.

The fastener may include a mandrel. The mandrel may transfer force through the body of the fastener to create the deformed area. The mandrel may be gripped by a tool which generates the force required to create the deformed area. The mandrel may not be required if a clinching, welding, stacking or other process is used to attach the body to the second panel. The mandrel may break into two pieces after the deformed area is created by applying additional axial force to the mandrel. The mandrel may break into two pieces at a predetermined location which is a break point. The mandrel may have a shank and a mandrel head.

The mandrel may include a shank. The shank may transfer force provided by a tool to the mandrel head. The shank may have serrations or other textures on its surface to enhance tool grip of the shank. The shank may be cylindrical. The shank may have a break point on its surface. The shank may reside within the body hole of the body prior to installation of the fastener. The shank may reside, reside partially, or not reside within the body hole after installation of the fastener.

The mandrel may include a mandrel head. The mandrel head may receive an axial force from the shank which it exerts on the body of the fastener. The mandrel head may exert force from the shank to the second cylindrical portion of the body. The force exerted by the mandrel head may create the deformed area.

The mandrel may include a break point. The break point may be a location where the shank breaks into two pieces. The break point may facilitate breaking of the shank when axial force is applied to the shank. The break point may require more force than creation of the deformed zone to break the shank. The break point may be a groove or other similar area of reduced diameter on the surface of the shank. The break point may act as a stress concentrator.

The fastener may include a head. The head may allow for separation of the first panel and the second panel when the head is removed from the body. The head may be affixed to the body prior to initial installation of the fastener. The head may constrain the first panel to the second panel when it is affixed to the body. The head may constrain the first panel to the second panel by abutting a surface of the first panel while the opposite surface of the first panel abuts the second panel. The head may be removably affixed to the body. The head may be removed from the body by applying torque to the head to rotate the head relative to the body. The head may be affixed to the body by reversing the direction of torque and rotation. The head may be attached to the body by use of a snap-on feature, spring feature or a press-fit connection. The head may have an exterior surface, Torque may be applied manually to the exterior surface. Torque may be transferred to the exterior surface of the head using a tool via a torque interface. The torque interface may be an exterior surface of the head. The head may have an interior threaded portion which allows for the head to be affixed to and removed from the body. The head may be a conventional nut. The head may have a centering feature which protrudes outward towards the first panel. The head may have one or more head protrusions which engage the first panel.

The head may include an exterior surface. The exterior surface of the head may be used to apply a torque to the head. The exterior surface may be a cylindrical, polygonal, or irregular shape. The exterior surface may have a domed shape. The exterior surface may include at least one pair of parallel surfaces for torque input. The exterior surface may have a surface texture. The exterior surface may be knurled, ribbed, or otherwise textured.

The head may include a torque interface. The torque interface may allow for a tool to engage with the head. The torque interface may allow for the tool to apply torque to the head. Torque applied to the head through the torque interface may rotate the head relative to the body. The torque interface may be hexagonal in shape such that a 6 point or 12 point socket may be used to turn the head. The torque interface may be square, pentagonal, hexagonal, or any other polygonal shape. The torque interface may be a 12-point, external Torx, or other proprietary external shape.

The head may include an interior threaded portion. The interior threaded portion of the head may allow for the head to be removably affixed to the body. The interior threaded portion of the head may interact with the exterior threaded portion of the body. The interior threaded portion of the head may allow for the head to be removed from the body when the head is rotated in one direction relative to the body. The interior threaded portion of the head may allow for the head to be affixed to the body when the head is rotated in an opposite direction relative to the body. The interior threaded portion may be formed of left hand threads or right hand threads. The interior threaded portion may be a standard (inch), metric, or other thread. The interior threaded portion of the head may be an internal thread while the exterior threaded portion of the body may be a complementary external thread.

The head may include a centering feature. The centering feature may aid with alignment of the head to the first panel. The centering feature may be a cylindrical protrusion from the head. The centering feature may have an outer diameter which is smaller than the first panel hole.

The head may include one or more head protrusions. The one or more head protrusions may engage the first panel. The one or more head protrusions may mechanically bite into the material of the first panel to prevent rotation of the head. The one or more head protrusions may be features which extend from the head towards the first panel. The one or more head protrusions may be knurling, ribbing, serrations, or other surface features.

The fastener may be comprised of one or more fastener materials. The body, mandrel, head, or any combination thereof may be a metal or any alloy thereof. The body, mandrel, head, or any combination thereof may be steel, aluminum, brass, or any alloy thereof. The body mandrel, head, or any combination thereof may be a thermoplastic thermoset, or other non-metal material. The fastener may be nylon, polycarbonate, polyethylene, or any other similar plastic.

The present teachings may relate to a panel assembly. The panel assembly may be created to affix or constrain one panel to one or more other panels. Panel assembly may include a first panel, second panel, or even additional panels. The panels may be retained together via a fastener according to the present teachings.

The panel assembly may include a first panel. The first panel may be fastened to a second panel. The first panel may be removably fastened to a second panel. The first panel may be a cover. The first panel may partially cover an otherwise inaccessible area. The first panel may need to be removed to access an otherwise inaccessible area. The first panel may need to be replaced if the first panel is damaged or otherwise compromised. The first panel may have a thickness. The first panel may have a length and width which are greater than the thickness of the first panel. The first panel may include a fastening feature. The fastening feature of the first panel may be a first panel hole.

The first panel may include a first panel hole. The first panel hole may allow for the fastener to fasten the first panel to the second panel. The fastener may be inserted into the first panel hole. The first panel hole may contain the first cylindrical portion of the body. The first panel hole may be separated from the fastener. The first panel hole may be a through hole. The first panel hole may be a circular hole. The first panel hole may have a diameter which is larger than the first diameter. The first panel hole may be triangular, square, pentagonal, hexagonal, or otherwise polygonal in shape.

The panel assembly may include a second panel. The second panel may be fastened to a first panel. The second panel may be removably fastened to a first panel. The second panel may have a cover affixed. The second panel may partially cover an otherwise inaccessible area. The second panel may need to be separated from a first panel to access an otherwise inaccessible area. The second panel may need to be replaced if the second panel is damaged or otherwise compromised. The second panel may have a thickness. The second panel may have a length and width which are greater than the thickness of the second panel. The second panel may include a fastening feature. The fastening feature of the second panel may be a second panel hole. The second panel may include a second panel hole.

The second panel may include a second panel hole. The second panel hole may allow for the fastener to fasten the first panel to the second panel. The fastener may be inserted into the second panel hole. The second panel hole may contain the second cylindrical portion of the body. The second panel hole may not be separated from the fastener after creation of the deformed area. The second panel hole may be a through hole. The second panel hole may be a circular hole. The second panel hole may have a diameter which is larger than the first diameter. The second panel hole may be triangular, square, pentagonal, hexagonal, or otherwise polygonal in shape.

Panels may relate to panels used in the automotive, aerospace, defense, or other industries. Panels may generally provide protection to components or systems on one side of the panel. An other side of the panel may be exposed to the environment. A panel assembly may surround components or systems which may need to be serviced. The panel assembly may make components or systems inaccessible. The panel assembly may allow for access to components or systems by removal of the first panel. The first panel may be temporarily removed by removing one or more heads from one or more fasteners. The first panel may be re-fastened by replacing one or more heads from one or more fasteners.

Panels may relate to panels made of one or more metals, polymers, fabrics, the like, or any combination thereof. Panels may be rigid, flexible, or a combination thereof. Panels may be steel, aluminum, brass, or any alloy thereof. Panels may be carbon fiber, garolite, fiberglass, or other composites. Panels may be polyethylene, polycarbonate, nylon, or other thermoplastics.

The present teachings may relate to a method for assembly a panel assembly. The method may use one or more of the fasteners as disclosed herein. The method may use one or more of the panels as disclosed herein. The method may allow for the removable fastening of a first panel to a second panel. The method may involve steps to initially fasten the first panel to the second panel. The method may involve steps to remove and re-fasten or re-constrain the first panel from and to the second panel, respectively. The method may include the steps of alignment, insertion, and deformation. The method may also include the steps of unfastening, removal, replacement, and re-fastening.

The method may include an alignment step. The alignment step may be to prepare a first panel and a second panel for fastening. The alignment step may include aligning a first panel hole and a second panel hole coaxially. The alignment step may include abutting the first panel and the second panel.

The method may include an insertion step. The insertion step may include insertion of a fastener which is not yet deformed into a first panel hole, a second panel hole, or both. The fastener may be inserted through the first panel hole first. The fastener may be inserted through the second panel hole until a shoulder abuts the second panel.

The method may include a deformation step. The deformation step may permanently affix or constrain the fastener to a second panel. The deformation step may removably affix or constrain the second panel to a first panel. The deformation step may require using a tool to deform the fastener. The deformation step may result in the creation of a deformed area of the body. The deformation step may include pulling of a mandrel to create a deformed area of the body.

The method may include an unfastening step. The unfastening step may release a first panel from being constrained or fastened to a second panel. The unfastening step may include removing a head from a body of a fastener. The unfastening step may include rotating the head relative to the body to remove the head from the body.

The method may include a removal step. The removal step may include removal of the first panel from the second panel. The removal step may be achieved by pulling the first panel away from the second panel. The removal step may include complete separation of the first panel from the second panel. The removal step may include the body of the fastener remaining within the second panel.

The method may include a replacement step. The replacement step may include abutting a first panel to a second panel. The replacement step may include aligning a first panel hole with a second panel hole. The replacement step may include a first panel which was previously affixed to the second panel or a first panel which is a new first panel.

The method may include a re-fastening step. The re-fastening step may include re-fastening or re-constraining a first panel to a second panel. The refastening step may include attachment of a head to a body of a fastener. The re-fastening step may include rotation of the head relative to the body. The re-fastening step may include rotation of the head relative to the body which is opposite the direction of rotation in the unfastening step.

Illustrative Examples

The following descriptions of the Figures are provided to illustrate the teachings herein but are not intended to limit the scope thereof.

Figure 1:
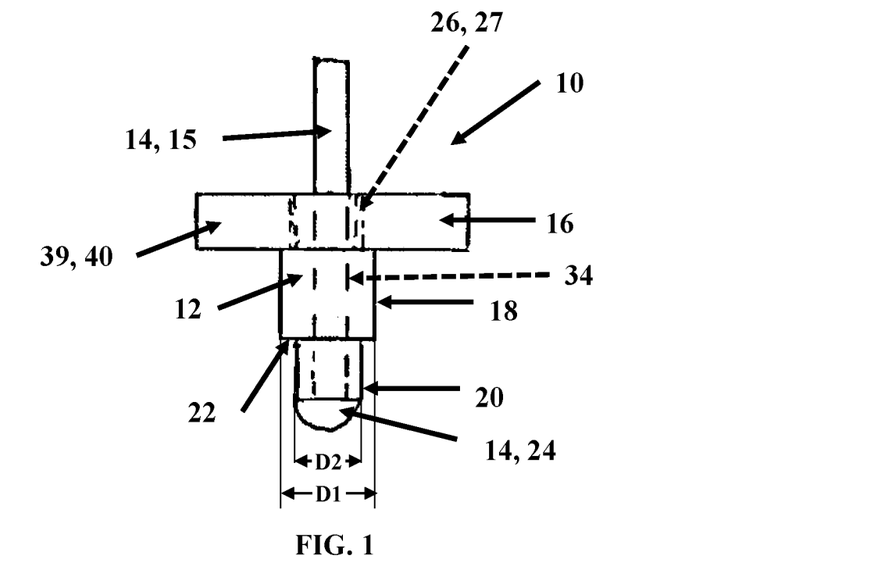
FIG. 1 is a front plan view of a fastener.

FIG. 1 is a front view of the fastener 10. The fastener 10 is in an undeformed state. The fastener 10 includes a body 12. The body 12 is removably affixed to a head 16 via an interior threaded portion 26 and an exterior threaded portion 27. The head has an exterior surface 39 which is a torque interface 40. The body 12 has a mandrel 14 which resides within a body hole 34 in the body 12. The mandrel 14 includes a shank 15. The shank 15 is located within the body hole 34. The mandrel 14 has a mandrel head 24. The mandrel head 24 is affixed to the shank 15. The mandrel head 24 is adjacent to and abuts the body 12 opposite the head 16. The body 12 has a first cylindrical portion 18 with a first diameter D1. The body 12 has a second cylindrical portion 20 with a second diameter D2. The second diameter D2 is smaller than the first diameter D1. The difference in diameter between the first cylindrical portion 18 and the second cylindrical portion 20 provides for a shoulder 22.

Figure 2:
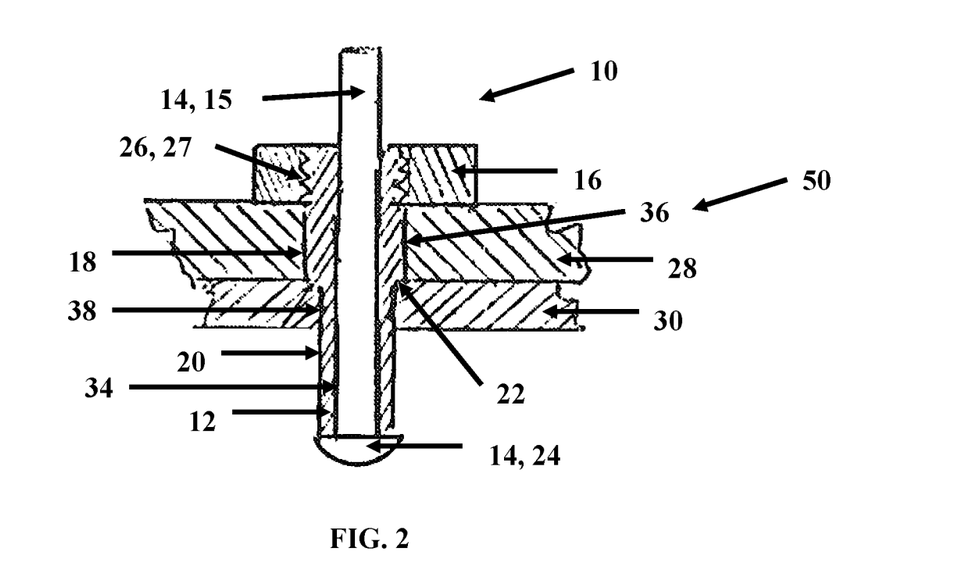
FIG. 2 illustrates a cross section of a fastener through a panel assembly.

FIG. 2 illustrates a cross section of the fastener 10. The fastener 10 is in an undeformed state. The fastener 10 includes a body 12. The body 12 is removably affixed to a head 16 via an interior threaded portion 26 and an exterior threaded portion 27. The body 12 has a mandrel 14. The mandrel 14 includes a shank 15. The shank 15 resides within a body hole 34 in the body 12. The mandrel 14 has a mandrel head 24. The mandrel head 24 is adjacent to and abuts the body 12 opposite the head 16. The body 12 has a first cylindrical portion 18 and a second cylindrical portion 20. The second cylindrical portion 20 is further from the head 16. The mandrel head 24 abuts to the second cylindrical portion 20. The radial plane between the first cylindrical portion 18 and the second cylindrical portion 20 is a shoulder 22. The mandrel head 24 rests against the second cylindrical portion 20. The fastener 10 is shown prior to creation of the deformed area 32 (not shown in this view). The fastener 10 is shown inserted into a panel assembly 50. The panel assembly 50 includes a first panel 28 and a second panel 30. The fastener 10 is shown inserted into a first panel hole 36 of a first panel 28 and a second panel hole 38 of a second panel 30. The first panel hole 36 is larger than the first diameter D1 of the first cylindrical portion 18 and smaller than the head 16. The second panel hole 38 is larger than the second diameter D2 of the second cylindrical portion 20 but smaller than the first diameter D1 of the first cylindrical portion 18. The second panel 30 is adjacent to and abuts the shoulder 22. The first panel 28 resides between and abuts both the second panel 30 and the head 16.

Figure 3:
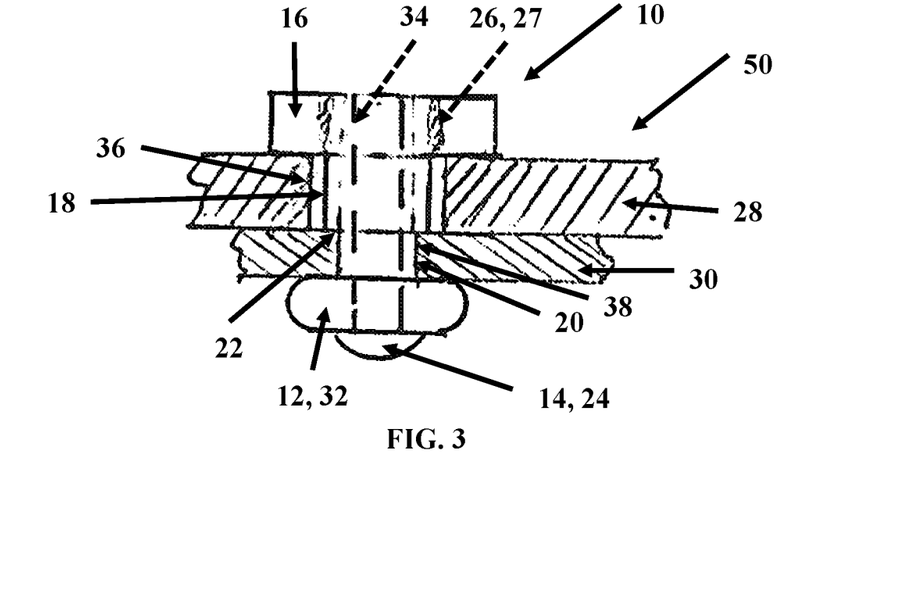
FIG. 3 illustrates a cross section of a fastener through a panel assembly.

FIG. 3 illustrates a cross-section of a fastener 10 in a deformed state fastened to a panel assembly 50. The head 16 is removably attached to the body 12 via an interior threaded portion 26 and an exterior threaded portion 27. The first panel 28 is adjacent to and abuts the head 16 with the body 12 occupying the first panel hole 36 in the first panel 28 which is larger than the first diameter D1 of the first cylindrical portion 18. The second panel 30 is adjacent to and abuts the shoulder 22. The second cylindrical portion 20 of the body 12 occupies the second panel hole 38. The second panel 30 is permanently constrained to the body 12 by being compressed between the shoulder 22 and a deformed area 32. The deformed area 32 is formed when an axial force is applied to the mandrel 14 which resides within the body hole 34 of the body 12. The mandrel head 24 of the mandrel 14 transfers axial force on the mandrel 14 to permanently deform the body 12 and create the deformed area 32.

Figure 4:
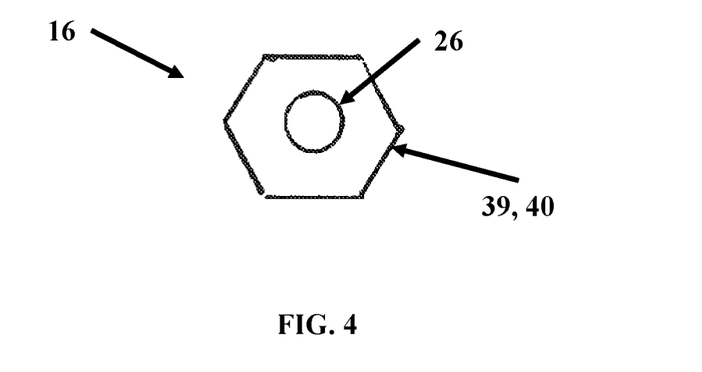
FIG. 4 is a top view of the head of a fastener.

FIG. 4 illustrates a top view of the head 16. The head 16 has an exterior surface 39. The exterior surface 39 is a torque interface 40. The torque interface 40 may interact with a tool (not shown). The head 16 has an inner surface which is an interior threaded portion 26.

Figure 5:
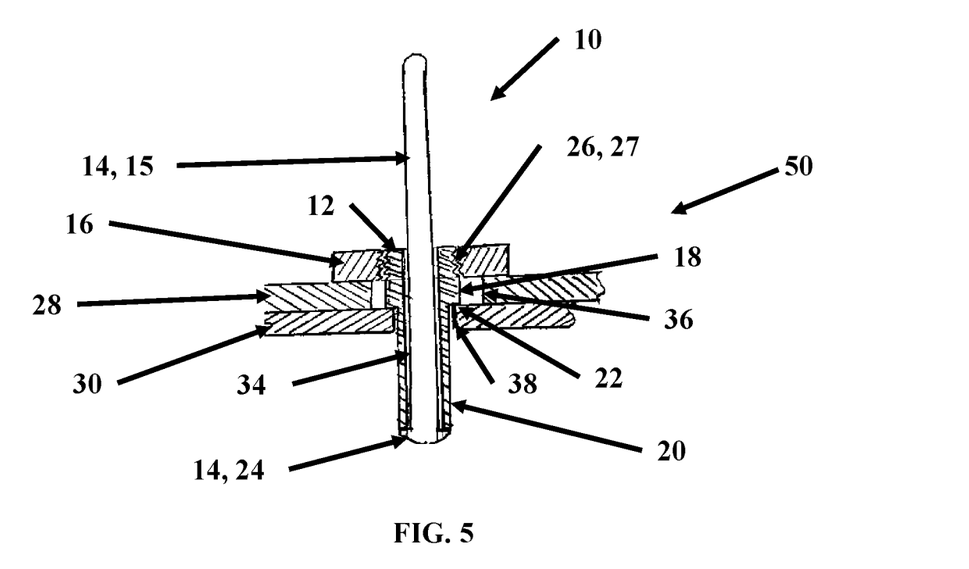
FIG. 5 illustrates a cross section of a fastener through a panel assembly.

FIG. 5 illustrates a cross section of the fastener 10 in an undeformed state. The fastener 10 includes a body 12. The body 12 is removably affixed to a head 16 via an interior threaded portion 26 and an exterior threaded portion 27. The body 12 has a mandrel 14. The mandrel 14 at least partially resides within a body hole 34 in the body 12. The mandrel 14 includes a shank 15. The mandrel 14 has a mandrel head 24. The mandrel head 24 is adjacent to and abuts the body 12 opposite the head 16. The body 12 additionally has a first cylindrical portion 18 and a second cylindrical portion 20. The mandrel head 24 abuts with the second cylindrical portion 20. The first cylindrical portion 18 forms a shoulder 22. The shoulder 22 projects beyond the second cylindrical portion 20. The fastener 10 is shown prior to creation of the deformed area 32 (not shown in this view). The fastener 10 is inserted in a panel assembly 50. The fastener 10 is shown inserted into a first panel hole 36 of a first panel 28 and a second panel hole 38 of a second panel 30. The first panel hole 36 is larger than the first diameter D1 of the first cylindrical portion 18 and smaller than the head 16. The second panel hole 38 is larger than the second diameter D2 of the second cylindrical portion 20 but smaller than the first diameter D1. The second panel 30 is adjacent to and abuts the shoulder 22. The first panel 28 resides between the second panel 30 and the head 16.

Figure 6:
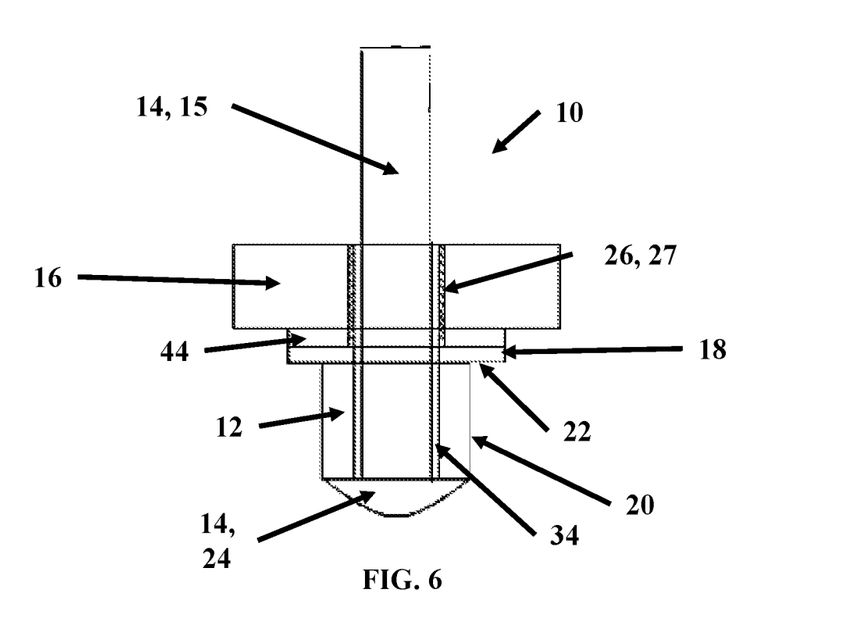
FIG. 6 is a transparent, front view of a fastener.

FIG. 6 illustrates a front view of the fastener 10. The fastener 10 is in an undeformed state. The fastener 10 includes a body 12. The body 12 is removably affixed to a head 16 via an interior threaded portion 26 and an exterior threaded portion 27. The head has a centering feature 44 which projects towards the body 12. The body 12 has a mandrel 14 which resides within a body hole 34 in the body 12. The mandrel 14 has a mandrel head 24 which is adjacent to and abuts the body 12 opposite the head 16. The mandrel 14 includes a shank 15. The shank 15 is located within the body hole 34. The mandrel head 24 is affixed to the shank 15. The body 12 additionally has a first cylindrical portion 18 and a second cylindrical portion 20. The radial plane between the first cylindrical portion 18 and the second cylindrical portion 20 is a shoulder 22.

Figure 7:
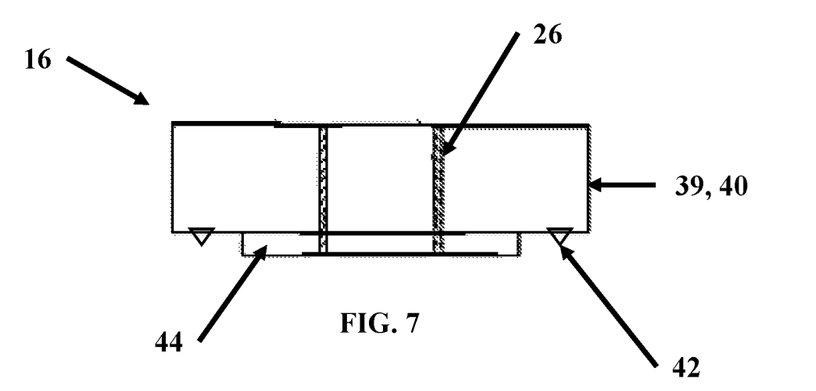
FIG. 7 is a transparent, front view of the head of a fastener.

FIG. 7 illustrates a front view of the head 16. The head 16 has an exterior surface 39. The exterior surface 39 is a torque interface 40. The torque interface 40 may interact with a tool (not shown). The head 16 has an inner surface which is an interior threaded portion 26. The head 16 has a protrusion which is a centering feature 44. The head 16 has protrusions which are head protrusions 42

Figure 8:
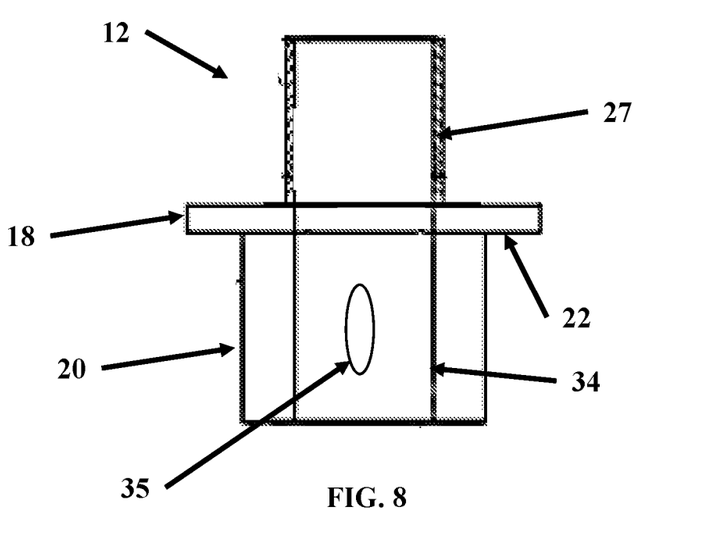
FIG. 8 is a transparent, front view of the body of a fastener.

FIG. 8 illustrates a front view of the body 12. The body 12 has a hole through its axis which is a body hole 34. The body 12 has an exterior threaded portion 27 on the outer surface of the top of the body 12. The body 12 has a first cylindrical portion 18 with a first diameter D1 and a second cylindrical portion 20 further from the threaded portion 26 with a second diameter D2. The radial plane between the first diameter 18 and the second diameter 20 is a shoulder 22. The body 12 has a radial hole in its surface which is a body opening 35.

Figure 9:
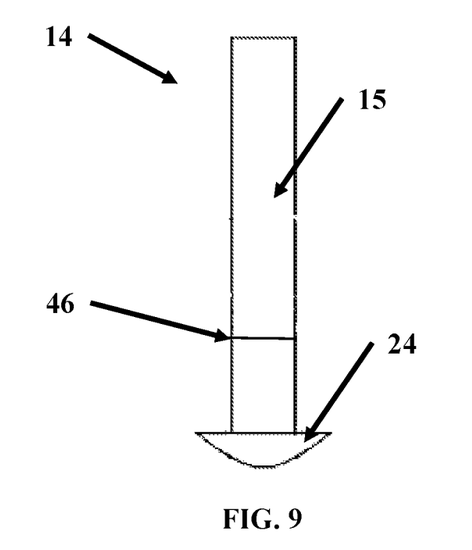
FIG. 9 is a front view of a mandrel.

FIG. 9 illustrates a front view of the mandrel 14. The mandrel 14 includes a shank 15. The shank 15 is a long cylinder. The shank 15 has a break point 46. The mandrel 14 includes a mandrel head 24. The mandrel head 24 is located at an end of the shank 15.

Figure 10:
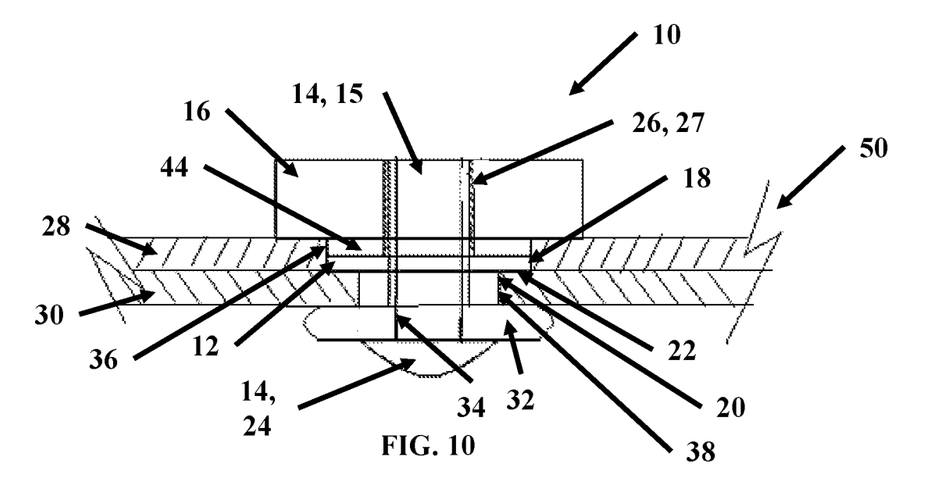
FIG. 10 illustrates a cross section of a fastener through a panel assembly.

FIG. 10 illustrates a fastener 10 in a deformed state through a panel assembly 50. The panel assembly 50 includes a first panel 28 and a second panel 30 with the fastener 10 secured by a deformed area 32. The head 16 is removably attached to the body 12 via an interior threaded portion 26 and an exterior threaded portion 27. The first panel 28 is adjacent to and abuts the head 16 with the body 12 occupying the first panel hole 36 in the first panel 28 which is larger than the first diameter D1 of the first cylindrical portion 18. The second panel 30 is adjacent to and abuts the shoulder 22 while the body 12 occupies the second panel hole 38. The second panel 30 is permanently constrained to the body 12 by being compressed between the shoulder 22 and the deformed area 32 on the second cylindrical portion 20. The deformed area 32 is formed when an axial force is applied through the shank 15 to the mandrel 14 which resides within the body hole 34 of the body 12. The mandrel head 24 of the mandrel 14 transfers axial force on the mandrel 14 to permanently deform the body 12 and create the deformed area 32. A centering feature 44 is also shown on the head 16.

Figure 11:
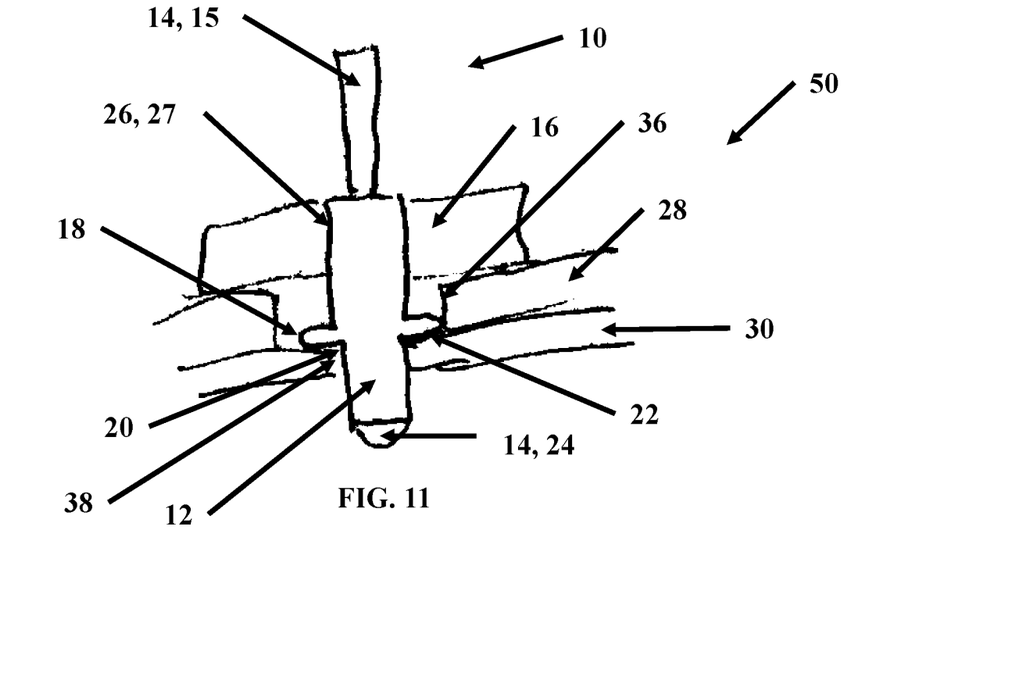
FIG. 11 illustrates a cross section of a fastener through a panel assembly.

FIG. 11 illustrates a cross section of the fastener 10. The fastener 10 is in an undeformed state. The fastener 10 includes a body 12. The body 12 is removably affixed to a head 16 via an interior threaded portion 26 and an exterior threaded portion 27. The body 12 has a mandrel 14. The mandrel 14 includes a shank 15. The shank 15 resides within a body hole 34 in the body 12. The mandrel 14 has a mandrel head 24. The mandrel head 24 is adjacent to and abuts the body 12 opposite the head 16. The body 12 has a first cylindrical portion 18 and a second cylindrical portion 20. The second cylindrical portion 20 is further from the head 16. The mandrel head 24 abuts to the second cylindrical portion 20. The radial plane between the first cylindrical portion 18 and the second cylindrical portion 20 is a shoulder 22. The mandrel head 24 rests against the second cylindrical portion 20. The fastener 10 is shown prior to creation of the deformed area 32 (not shown in this view). The fastener 10 is shown inserted into a panel assembly 50. The panel assembly 50 includes a first panel 28 and a second panel 30. The fastener 10 is shown inserted into a first panel hole 36 of a first panel 28 and a second panel hole 38 of a second panel 30. The first panel hole 36 is larger than the first diameter D1 of the first cylindrical portion 18 and smaller than the head 16. The second panel hole 38 is larger than the second diameter D2 of the second cylindrical portion 20 but smaller than the first diameter D1 of the first cylindrical portion 18. The second panel 30 is adjacent to and abuts the shoulder 22. The first panel 28 resides between and abuts both the second panel 30 and the head 16.

Figure 12:
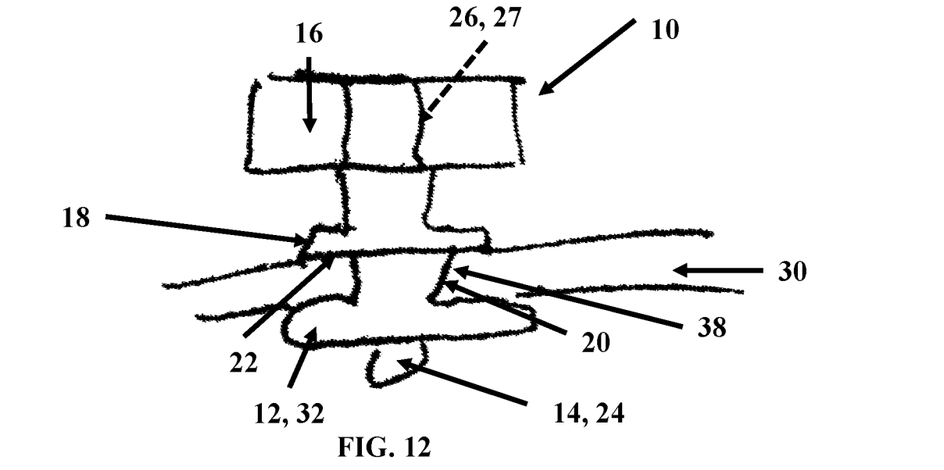
FIG. 12 illustrates a cross section of a fastener in a second panel.

FIG. 12 illustrates a cross section of the fastener 10. The fastener 10 is in a deformed state. The fastener 10 has a body 12. The body 12 is affixed to the head 16 via an interior threaded portion 26 and an exterior threaded portion 27. The body 12 has a mandrel 14 which passes through the body 12. The mandrel 14 has a shank 15 and a mandrel head 24. The fastener 10 is shown in a second panel 30. The second cylindrical portion of the body 20 resides in a second panel hole 38 of the second panel 30. The second panel sits between the deformed area 32 and the shoulder 22 of the body 12. The body also has a first diameter 18.

Figure 13:
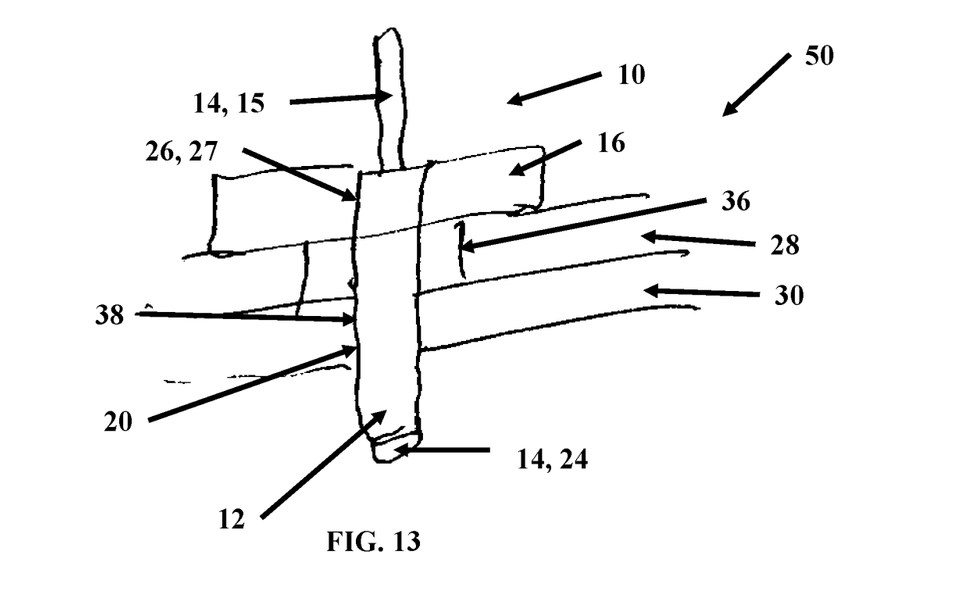
FIG. 13 illustrates a cross section of a fastener through a panel assembly.

FIG. 13 illustrates a cross section of the fastener 10. The fastener 10 is in an undeformed state. The fastener 10 includes a body 12. The body 12 is removably affixed to a head 16 via an interior threaded portion 26 and an exterior threaded portion 27. The body 12 has a mandrel 14. The mandrel 14 includes a shank 15. The mandrel 14 has a mandrel head 24. The mandrel head 24 is adjacent to and abuts the body 12 opposite the head 16. The body 12 has a second cylindrical portion 20. The second cylindrical portion 20 is further from the head 16. The mandrel head 24 abuts to the second cylindrical portion 20. The mandrel head 24 rests against the second cylindrical portion 20. The fastener 10 is shown prior to creation of the deformed area 32 (not shown in this view) and the first cylindrical portion 18 (not shown in this view). The fastener is shown inserted into a panel assembly 50. The panel assembly 50 includes a first panel 28 and a second panel 30. The fastener 10 is shown inserted into a first panel hole 36 of a first panel 28 and a second panel hole 38 of a second panel 30. The first panel hole 36 is smaller than the head 16. The second panel hole 38 is larger than the second diameter D2 of the second cylindrical portion 20. The first panel 28 resides between and abuts both the second panel 30 and the head 16.

Figure 14:
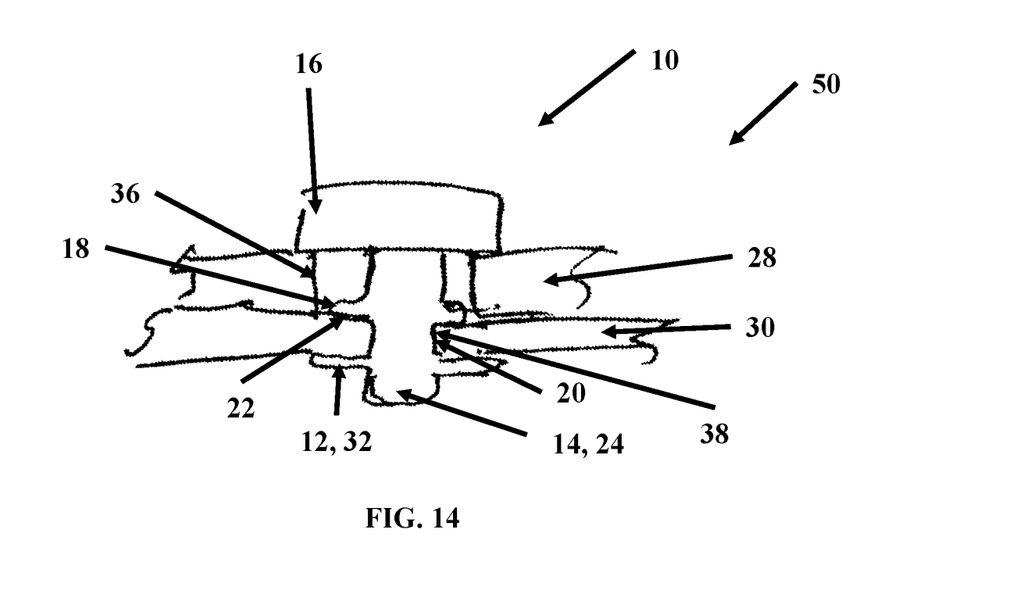
FIG. 14 illustrates a cross section of a fastener through a panel assembly.

FIG. 14 illustrates a cross-section of a fastener 10 in a deformed state fastened to a panel assembly 50. The head 16 is removably attached to the body 12 via an interior threaded portion 26 and an exterior threaded portion 27 (not shown in this view). The first panel 28 is adjacent to and abuts the head 16 with the body 12 occupying the first panel hole 36 in the first panel 28 which is larger than the first diameter D1 of the first cylindrical portion 18. The first cylindrical portion 18 was formed as a result of the same force which created the deformed area 32. The second panel 30 is adjacent to and abuts the shoulder 22. The second cylindrical portion of the body 12 occupies the second panel hole 38. The second panel 30 is permanently constrained to the body 12 by being compressed between the shoulder 22 and a deformed area 32. The deformed area 32 is formed when an axial force is applied to the mandrel 14 which resides within the body hole 34 of the body 12. The mandrel head 24 of the mandrel 14 transfers axial force on the mandrel 14 to permanently deform the body 12 and create the deformed area 32.

Any numerical values recited in the above application include all values from the lower value to the upper value in increments of one unit provided that there is a separation of at least 2 units between any lower value and any higher value. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints.

The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

What is claimed is:

1. A fastener comprising:
   a) a body having:
      i) a first cylindrical portion with a first diameter and having an exterior threaded portion,
      ii) a second cylindrical portion with a second diameter,
      iii) a shoulder formed between the first cylindrical portion and the second cylindrical portion due to a difference in the first diameter and the second diameter, and
      iv) a body hole extending along an axis of the body through both the first cylindrical portion and the second cylindrical portion;
   b) a mandrel having:
      i) a mandrel shank, and
      ii) a mandrel head at an end of the mandrel shank; and
   c) a fastener head having:
      i) an opening defined by an interior threaded portion; and
      ii) one or more head protrusions on a surface facing toward the mandrel head and configured to embed into a first panel;
      iii) a centering feature formed as a protrusion facing toward the mandrel head and configured to align the fastener with a first panel hole of the first panel;
   wherein the mandrel shank at least partially occupies the body hole;
   wherein the mandrel head is located outside of the body and opposite of the exterior threaded portion of the body;
   wherein the exterior threaded portion of the body and the interior threaded portion of the fastener head are engaged to removably secure the body to the fastener head; and
   wherein the fastener is configured to be deformed from an undeformed state into a deformed state.

2. The fastener of claim 1, wherein in the deformed state, a deformed area results on the body after the mandrel shank of the mandrel opposite of the mandrel head is pulled axially such that the mandrel head is pulled toward the fastener head.

3. The fastener of claim 2, wherein the first cylindrical portion of the body occupies the first panel hole in the first panel, and the second cylindrical portion of the body occupies a second panel hole in a second panel; and
   wherein the second panel hole in the second panel is smaller in diameter than the first diameter of the first cylindrical portion of the body.

4. The fastener of claim 3, wherein when the fastener is in the deformed state, the second panel is permanently mechanically constrained between the shoulder of the body and the deformed area of the body.

5. The fastener of claim 4, wherein when the fastener is in the deformed state, the first panel is removably constrained between the fastener head and the second panel due to the fastener head being removably secured to the body.

6. The fastener of claim 5, wherein the first panel is removable from the second panel and the body by applying torque to the fastener head until the fastener head rotates relative to the body and is separated from the body by the interior threaded portion disengaging from the exterior threaded portion.

7. The fastener of claim 6, wherein the first panel is removably re-constrained to the body and the second panel by rotating the fastener head relative to the body and applying torque to the fastener head until the fastener head and the body are mechanically constrained by reengaging the interior threaded portion with the exterior threaded portion.

8. The fastener of claim 2, wherein the mandrel breaks into two pieces at the mandrel shank at a break point due to additional axial pulling force on the mandrel shank after a creation of the deformed area.

9. The fastener of claim 1, wherein the body has an external surface texture along the first cylindrical portion, the second cylindrical portion, or both and the surface texture is a knurl, ribbing, or a combination thereof.

10. The fastener of claim 1, wherein the fastener head has a hexagonal, a quadrangular, or other polygonal perimeter.

11. The fastener of claim 1, wherein the fastener is made of steel, aluminum, brass, or any alloy thereof.

12. The fastener of claim 1, wherein the centering feature is a cylindrical protrusion from the fastener head and has an outer diameter smaller than the first panel hole.

13. A process for removably affixing a first panel to a second panel using a fastener, wherein the fastener comprises:
   a) a body having a first cylindrical portion with a first diameter, a second cylindrical portion with a second diameter, a shoulder between the first cylindrical portion and the second cylindrical portion, an exterior threaded portion part of the first cylindrical portion, and a body hole extending along an axis of the body;
   b) a mandrel having a mandrel shank and a mandrel head at an end of the mandrel shank; and
   c) a fastener head having an opening defined by an interior threaded portion, one or more head protrusions on a surface facing toward the mandrel head and configured to embed into the first panel, and a centering feature formed as a protrusion facing toward the mandrel head and configured to align the fastener with a first panel hole of the first panel;
      wherein the mandrel shank at least partially occupies the body hole;
      wherein the mandrel head is located outside of the body and opposite of the exterior threaded portion of the body; and wherein the exterior threaded portion of the body and the interior threaded portion of the fastener head are engaged to removably secure the body to the fastener head;

wherein the process comprises the steps of:

1) coaxially aligning the first panel hole in the first panel with a second panel hole in the second panel while the first panel and the second panel are in contact with each other;
2) inserting the body of the fastener through the first panel hole in the first panel and the second panel hole in the second panel with the fastener head adjacent to the first panel; and
3) deforming the fastener such that a deformed area of the body is created by axially pulling the mandrel that extends axially through the body on a side opposing the mandrel head such that the mandrel head creates the deformed area by compressing and plastically deforming the body, wherein the body constrains the second panel between the deformed area and the shoulder of the fastener and the first panel is constrained between the second panel and the fastener head.

14. The process of claim 13, additionally comprising the steps of:

4) removing the fastener head from the body by applying torque to the fastener head sufficient to release the fastener head from the body via a threaded portion of the fastener head and the body;
5) removing the first panel from the second panel while the body of the fastener remains permanently affixed to the second panel;
6) re-inserting the body of the fastener into the first panel hole; and
7) re-engaging the threaded portion of the fastener head and the body and applying torque sufficient to mechanically constrain the first panel to the second panel.

15. A panel assembly comprising:
a) a first panel having a first panel hole;
b) a second panel having a second panel hole; and
c) a fastener comprising:
  i) a body having:
    A) a first cylindrical portion with a first diameter and having an exterior threaded portion,
    B) a second cylindrical portion with a second diameter,
    C) a shoulder between the first cylindrical portion and the second cylindrical portion due to a difference in the first diameter and the second diameter,
    D) a cylindrical hole extending along an axis of the body through both the first cylindrical portion and the second cylindrical portion;
  ii) a mandrel having:
    A) a mandrel shank, and
    B) a mandrel head at an end of the mandrel shank; and
  iii) a fastener head having:
    A) an opening defined by an interior threaded portion; and
    B) one or more head protrusions on a surface facing toward the mandrel head and embedded into the first panel;
    C) a centering feature formed as a protrusion facing toward the mandrel head and which aligns the fastener with the first panel hole of the first panel;
wherein the mandrel shank at least partially occupies the cylindrical hole of the body;

wherein the mandrel head is located outside of the body and opposite of the exterior threaded portion of the body;

wherein the exterior threaded portion of the body and the interior threaded portion of the fastener head are engaged to removably secure the body to the fastener head;

wherein the fastener is configured to be deformed from an undeformed state into a deformed state and secures the first panel to the second panel in the deformed state;

wherein in the deformed state, a deformed area results on the body when the mandrel shank opposite of the mandrel head is pulled axially such that the mandrel head is pulled toward the fastener head;

wherein the first cylindrical portion of the body occupies the first panel hole in the first panel and the second cylindrical portion of the body occupies the second panel hole in the second panel;

wherein the second panel hole is smaller in diameter than the first diameter of the first cylindrical portion of the body;

wherein the second panel is permanently mechanically constrained between the shoulder of the body and the deformed area of the body; and wherein the first panel is removably constrained between the fastener head and the second panel.

16. The panel assembly of claim 15, wherein the first panel is removable from the second panel and the body by applying torque to the fastener head until the fastener head rotates relative to the body and is separated from the body by the interior threaded portion disengaging from the exterior threaded portion.

17. The panel assembly of claim 16, wherein the first panel is removably re-constrained to the body and the second panel by rotating the fastener head relative to the body and applying torque to the fastener head until the fastener head and the body are mechanically constrained by reengaging the interior threaded portion with the exterior threaded portion.

18. The panel assembly of claim 15, wherein the mandrel breaks into two pieces at the mandrel shank at a reduced mandrel diameter zone due to additional axial pulling force on the mandrel shank after the creation of the deformed area.

19. The panel assembly of claim 15, wherein the body has an external surface texture along the first cylindrical portion, the second cylindrical portion, or both and the surface texture is a knurl, ribbing, or a combination thereof.

20. A panel assembly comprising:
a) a first panel having a first panel hole;
b) a second panel having a second panel hole aligned with the first panel hole; and
c) a fastener comprising:
  i) a body having:
    A) a first cylindrical portion with a first diameter and having an exterior threaded portion,
    B) a second cylindrical portion with a second diameter,
    C) a shoulder formed between the first cylindrical portion and the second cylindrical portion due to the difference in the first diameter and the second diameter,
    D) a cylindrical hole extending along an axis of the body through both the first cylindrical portion and the second cylindrical portion;

ii) a mandrel having:
   A) a mandrel shank, and
   B) a mandrel head at an end of the mandrel shank; and
iii) a fastener head having:
   A) an opening defined by an interior threaded portion; and
   B) one or more head protrusions on a surface facing toward the mandrel head and embedded into the first panel;
   C) a centering feature formed as a protrusion facing toward the mandrel head which aligns the fastener with the first panel hole of the first panel;
wherein the mandrel shank at least partially occupies the cylindrical hole of the body;
wherein the mandrel head is located outside of the body and opposite of the exterior threaded portion of the body;
wherein the exterior threaded portion of the body and the interior threaded portion of the fastener head are engaged to removably secure the body to the fastener head;
wherein the fastener is configured to be deformed from an undeformed state into a deformed state and secures the first panel to the second panel in the deformed state;
wherein in the deformed state, a deformed area results on the body when the mandrel shank opposite of the mandrel head is pulled axially such that the mandrel head is pulled toward the fastener head;
wherein the mandrel breaks into two pieces at the mandrel shank at a reduced mandrel diameter zone due to additional axial pulling force on the mandrel shank after a creation of the deformed area;
wherein the first cylindrical portion of the body occupies the first panel hole in the first panel, and the second cylindrical portion of the body occupies the second panel hole in the second panel;
wherein the second panel hole is smaller in diameter than the first diameter of the first cylindrical portion of the body;
wherein the body has an external surface texture along the first cylindrical portion, the second cylindrical portion, or both, and the external surface texture is a knurl, ribbing, or a combination thereof;
wherein the second panel is permanently mechanically constrained between the shoulder of the body and the deformed area of the body;
wherein the first panel is removably constrained between the fastener head and the second panel;
wherein the first panel is removable from the second panel and the body by applying torque to the fastener head until the fastener head rotates relative to the body and is separated from the body by the interior threaded portion disengaging from the exterior threaded portion; and
wherein the first panel is removably re-constrained to the body and the second panel by rotating the fastener head relative to the body and applying torque to the fastener head until the fastener head and the body are mechanically constrained by reengaging the interior threaded portion with the exterior threaded portion.

* * * * *